Patented Jan. 19, 1932

1,842,139

UNITED STATES PATENT OFFICE

GEORGE W. ALSDORF, OF MIAMI BEACH, FLORIDA

METHOD OR PROCESS OF PRODUCING ROAD PAVING MATERIAL

No Drawing.   Application filed December 12, 1928.   Serial No. 325,665.

This invention relates to an improved method or process of producing road paving material and is limited to that class of paving material utilizing a mineral body or aggregate, composed of broken stone, gravel, sand, slag and the like which is combined with a bituminous coating, the principal object of this invention being to provide a simple, practicable and efficient process whereby the mineral body or aggregate, containing some moisture may be uniformly coated with bituminous binder without necessitating first the heating of the mineral body beyond a temperature of 200° F. This application is a continuation in part of my co-pending application Serial No. 199,128, filed June 15, 1927.

It has heretofore been the usual practice in the combining of road materials of this kind to heat the aggregate prior to mixing the same with the bitumen in order to thoroughly dry the aggregate before the bitumen is added and to thereby enable the bitumen to properly unite and adhere to the surfaces of the aggregate to the required extent. It is necessary under this practice that the aggregate be thoroughly dry and free from moisture because water and hydrocarbons do not mix and where the bitumen is applied to aggregate containing moisture the bitumen does not penetrate particles of aggregate and does not firmly unite with the same, with the result that there is no union of the materials and the bitumen will peel off from the particles of aggregate when subjected to continued contact with water in the road surfaces. All aggregate when manufactured contains more or less moisture, certain hard inpenetrable stones like trap rock may contain very little moisture, while other minerals which are more porous, like some limestones, may contain sufficient moisture to necessitate such aggregate being heated far above the temperature of 200° F. in order to permit of the bitumen being mixed with the aggregate under this method. Therefore, in carrying out the present invention I have discovered that by first applying to the cold moist stone or aggregate a small amount of a hydrocarbon emulsion, which may consist of naptha, gasoline, kerosene and gas oil, fuel oil, tar, liquid asphalt or any hydrocarbon in liquid form, emulsified in water in connection with an emulsifying agent, and then adding to the aggregate the bitumen in liquid form and mixing thoroughly until all of the stones are coated that the bitumen will tenaciously adhere to the aggregate thus enabling the required amount of bitumen to be applied.

By the use of this method the hydrocarbon emulsion, which is capable of mixing with water, upon covering particles of aggregate unites and mixes with water on the moist surfaces of the stone particles and even penetrates the porous damp stones so that the liquid bitumen, either hot or cold, when added to the mixture unites with the emulsion coating, the emulsion coating acting as a binder between the damp aggregate and the liquid bitumen. As the mixture dries out on the road surface a firm adhesive coat of bitumen remains on the surfaces of the stone aggregate which does not peel off on exposure to wet weather or other climatic conditions. This method produces a paving material which can be produced in one locality, stored and transported and subsequently successfully used, without re-heating, in the building and repairing of roads, streets and other surfaces of a similar or similarly prepared nature.

I have found it desirable, in order to promote the union of the hydrocarbon emulsion with the bitumen on the surfaces of the particles of aggregate, in preparing the hydrocarbon emulsion, that a slight excess of the emulsifying agent be added to the mixture.

Without limiting myself to the proportions stated and as an example of my preferred method, I apply to each ton of the aggregate, the temperature of which is below 200° F. and which usually contains some moisture, 1 to 3 gallons of hydrocarbon emulsion. This material may consist of asphalt, tar, crude oil or hydrocarbon distillate in liquid form emulsified in water in connection with an emulsifying agent. The stone or like aggregate is weighed, placed in a mixer and the emulsion added, and the entire mass agitated sufficiently so that the thin emulsion will spread effectively over all of the surfaces of the stone or mineral body comprising the aggregate. Immediately following this operation and without removing the aggregate from the mixer, I add to the aggregate heated asphalt to the extent of 4 to 7 per cent by weight of the aggregate. This asphalt is then thoroughly mixed with the aggregate and adheres readily to the surfaces of the stone due to the prior coating provided on the stone by the thin emulsion, the latter enabling a desired quantity of the asphalt of proper penetration to adhere to the stone so that the preparation may be subsequently stored and transported and will be in proper condition for use when spread upon a road surface and rolled, the latter operation being performed without reheating the material at the time of laying or rolling.

Either hot or cold asphalt can be mixed with the aggregate after the hydrocarbon emulsion is added. If cold, the asphalt must, however, be previously mixed with a suitable bitumen solvent, such as kerosene or gasoline, in order to reduce the asphalt to a fluid state.

I have also discovered that instead of adding first a hydrocarbon emulsion to the stone aggregate, the ingredients which would form a hydrocarbon emulsion can be added separately. Thus, for example, I find that, to the stone aggregate which is below 200° F. in temperature, there may be first added a solution of water and an emulsifying agent, then a liquid hydrocarbon, and after the mixture has been agitated, the liquid asphalt or a mixture of liquid hydrocarbon and asphalt may be added thereto.

Without limiting myself to the sizes of stone, the proportions or temperatures stated, I have found it a satisfactory method to heat stone aggregate, varying in size from ¾" to dust, to a temperature of about 125° F., and after placing the heated aggregate in a standard asphalt pug mixer to immediately add to the aggregate a soap solution to the extent of 1 gallon of soap solution for each ton of aggregate. The soap solution consists of soap dissolved in water in the proportions of 1 pound of soap to each gallon of water. After the soap solution is thoroughly mixed with the aggregate there is added to the mixture kerosene to the extent of 1½ to 2 gallons of kerosene to each ton of the aggregate. The mass is then agitated until it causes the stone to be coated with the resultant kerosene emulsion. When the stone has been thoughly coated with the emulsion there is added to the mixture, asphalt, which is from 60 to 100 penetration test and of an approximate temperature of 325° F., at the rate of 140 pounds of asphalt for each ton of aggregate, the resultant mass being thoroughly mixed until all of the stone is completely covered by the asphalt. My process, therefore, produces materials of the kind set forth which will possess the desired degree of pliability or mobility and insures the maintenance thereof in this condition for future use, a material that can be laid cold and transported long distances and laid and rolled some months afterward if desired. My process, therefore, is an improvement over the standard hot mixing method for when the standard hot mixing method is used the material must be laid at once while it is hot. It will be understood that in the process of coating cold stone with an emulsified product alone, it has been found very difficult to obtain a thick enough coat of asphalt on the stone for satisfactory work on account of the thinness of the emulsified mixture, but by my method of coating the cold damp stone first, as above set forth, with a thin coat of hydrocarbon emulsion, an adhesive thin layer is produced to which the main body of bitumen subsequently added will readily unite so as to produce a coating of uniform and desired thickness.

A further advantage is found in that by the use of my method only a small part of the asphalt in the mixture is emulsified while in the emulsion method all of the asphalt is emulsified with the result that because of the small amount of water contained in the mixture no curing is required when my method is used but when the emulsion method is used the mixture must be cured for 24 hours or more in order to permit of the evaporation of the excess water contained therein.

I am aware of prior methods wherein a cold mineral aggregate has been directly coated with asphalt which has been fluxed with a lighter hydrocarbon such as naptha, gasoline or kerosene to a point where it will coat the aggregate. This method, however, requires that an excess of the liquefying agent be used with the result that the mixture as applied is too thin so that in sufficient asphalt adheres to the stone. This method also requires considerable time for the binder to dry because the liquefying agent must be allowed to evaporate. By the provisions in my process the materials are ready for instant use as soon as the final asphalt coat has been mixed with the aggregate and there is no period of setting or curing required. In prior methods wherein the cold mineral aggregate is not heated sufficiently to drive off all the moisture contained therein and wherein the mineral aggregate is first mixed with a volatile hydrocarbon and immediatley thereafter the asphalt is added to the mixture and mixed therewith, the asphalt does not unite perfectly with the damp stone because the moisture contained in the stone prevents a perfect union or bonding between the stone and the asphalt with the result that there is later some peeling off or separating of the asphalt coating from the stone. By the use of my method of first coating the aggregate with a hydrocarbon emulsion this difficulty is entirely overcome and the asphalt bonds and unites firmly with the stone. Moreover, I have observed that in employing my process the aggregate is uniformly coated with asphalt and remains in this state at all times during the handling; that this is maintained without additional agitation, the same being in contrast with the prior method of applying the emulsifying bitumen which has a tendency to run off of the stone in the upper part of the pile and to collect unduly at the base of the pile. This is particularly noticeable in the materials when initially mixed and does not entirely abate until the setting or curing operation is completed, the result being that the minerals are not entirely uniformly coated with the bitumen throughout the entire mass thereof. This condition I distinctly avoid.

It will be understood that by the expression cold aggregate I intend to include any temperature not in excess of 200° F. and which will not vaporize the hydrocarbon emulsion.

What is claimed is:

1. The process of producing road paving materials, which consists in thoroughly mixing a mineral aggregate while in a partially moist condition with a liquid consisting of a thin hydrocarbon solvent emulsified in water by means of an emulsifying agent, and in then adding to the aggregate and in thoroughly mixing therewith a binder in the form of heated bitumen, the emulsion serving to enable the bitumen to readily cling to the mineral particles of the aggregate and to build up thereon a bituminous coating of desired thickness.

2. The process of producing paving materials, which consist in intimately mixing a given body of mineral aggregate while in a partially moist condition with an emulsion comprising a hydrocarbon solvent emulsified in water by means of a soluble emulsifying agent, and in then immediately adding to the aggregate and thoroughly mixing therewith an asphalt binder, the latter serving to readily adhere to the surfaces of the aggregate by reason of the presence of the hydrocarbon emulsion coating initially applied to the aggregate.

3. The process of producing road paving materials, which consists in thoroughly mixing a mineral aggregate while in a cold moist condition with a liquid emulsion consisting of kerosene emulsified in water by means of a soluble emulsifying agent, and in then adding to the aggregate and thoroughly mixing therewith a binder in the form of heated bitumen, the emulsion serving to enable the bitumen to readily cling to the mineral particles of the aggregate and to build up thereon a bituminous coating of desired thickness.

4. The process of producing road paving materials, which consists in thoroughly mixing a mineral aggregate while in a cold moist condition with a liquid comprising kerosene emulsified in water by means of an emulsifying agent equal to one-half to one and one-half percent by weight of the aggregate, and then adding to the aggregate and thoroughly mixing therewith a binder in the form of bitumen in a fluid state.

5. The process of producing road paving materials which consists in thoroughly mixing a mineral aggregate with an emulsion comprising a liquid hydrocarbon emulsified in water by means of a soluble soap in the proportion of 1 to 3 gallons of said liquid to each ton of aggregate and in then adding to said mixture 4 to 7% by weight of heated asphalt and continuing the mixing operation until all the stone particles are covered by the asphalt.

6. The process of producing road paving materials which consists in thoroughly mixing a mineral aggregate at a temperature of approximately 125° F. with a solution of soap and water in the proportions of 1 gallon of solution to 1 ton of aggregate, and in then adding to and mixing with said mixture kerosene in the proportions of one and one-half to two gallons of kerosene to one ton of aggregate, and in then adding to and mixing with said mixture asphalt at the temperature of 300° F. in the proportions of 140 pounds of asphalt to each ton of aggregate.

7. In a process of producing paving materials which consists in coating a mineral aggregate while at a temperature below 200° F. with a thin hydrocarbon solvent emulsified in water, and in then adding to the aggregate an asphalt binder, the emulsion serving to enable the binder to bond with the aggregate and thereby producing a bitumen coating of desired thickness.

8. In a process of producing paving materials, which consists in coating a mineral aggregate while below 200° F. in temperature with a liquid emulsion comprisng a thin hydrocarbon solvent emulsified in water by means of a soluble emulsifying agent and then while the emulsion is in an active state upon the aggregate thoroughly mixing with the latter a body of asphalt in a heated condition, the emulsion serving to produce localized softening of the asphalt to enable the latter to adhere tenaciously to the mineral aggregate.

In testimony whereof I affix my signature.

GEORGE W. ALSDORF.